United States Patent [19]
Beck et al.

[11] Patent Number: 5,257,376
[45] Date of Patent: Oct. 26, 1993

[54] METHOD AND APPARATUS FOR CONFIGURING A CONTROL PROGRAM NUCLEUS WITH A MINIMUM IMPACT ON SYSTEM AVAILABILTIY

[75] Inventors: Gary S. Beck, Endicott; Warren K. Jones, Endwell; Dennis R. Musselwhite, Endicott, all of N.Y.

[73] Assignee: International Business Machines Corporation, Armonk, N.Y.

[21] Appl. No.: 577,299

[22] Filed: Sep. 4, 1990

[51] Int. Cl.$^5$ .......................... G06F 9/00; G06F 12/06
[52] U.S. Cl. ..................... 395/700; 395/650; 364/221; 364/280
[58] Field of Search ............... 371/16.1; 395/400, 575, 395/375, 700, 650, 275, 425, 600

[56] References Cited

U.S. PATENT DOCUMENTS

| | | | |
|---|---|---|---|
| 4,862,349 | 8/1989 | Foreman et al. | 395/700 |
| 4,885,651 | 12/1989 | Umeno et al. | 364/200 |
| 4,888,771 | 12/1989 | Benignus et al. | 371/16.1 |
| 5,063,500 | 11/1991 | Shorter | 395/200 |
| 5,113,509 | 5/1992 | Pennings et al. | 395/425 |
| 5,201,049 | 4/1993 | Shorter | 395/650 |

OTHER PUBLICATIONS

IBM TDS, vol. 16, No. 12, May 1974, "Dynamic System Configuration" by H. J. McAuley et al.
IBM TDS, vol. 20, No. 8, Jan. 1987, "Dynamic Configurability" by Bourke et al.

*Primary Examiner*—Gareth D. Shaw
*Assistant Examiner*—Kevin Spivak
*Attorney, Agent, or Firm*—Pollock, Vande Sande & Priddy

[57] ABSTRACT

A system for reconfiguring a multiple user VM computing system is described. A CMS source file is used to generate new nucleus system definitions for a control program of an operating VM system. The CMS source file is edited and converted to a tag entry format for use in a diagnose interface. Using the diagnose interface, an override disk under control of the control program may be updated with new override data. In a subsequent system IPL, or upon issuance of an OVERRIDE command with the IMMEDIATE option from the CMS application, the newly-stored data from the CP override DASD may be loaded in the control program memory.

21 Claims, 8 Drawing Sheets

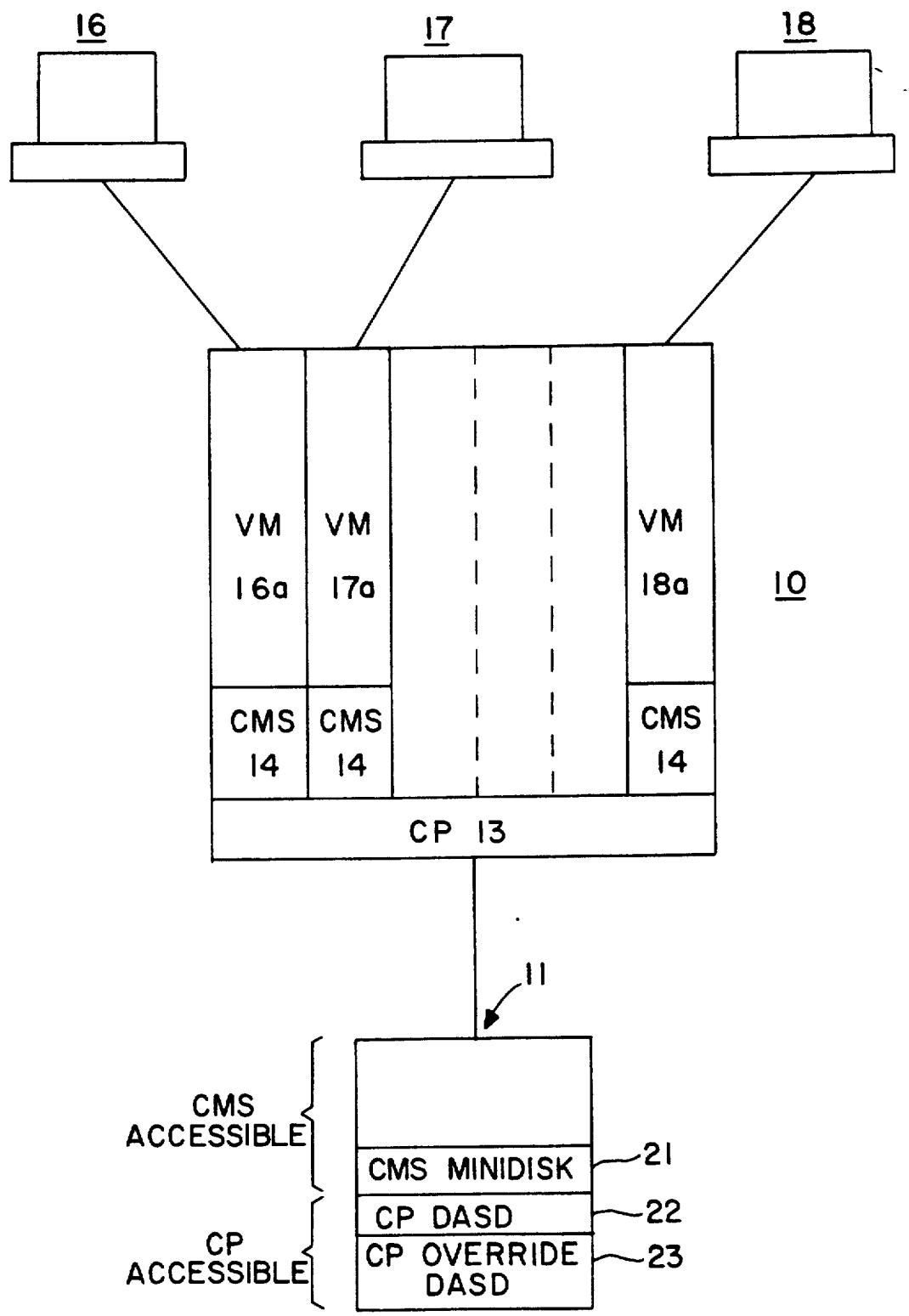

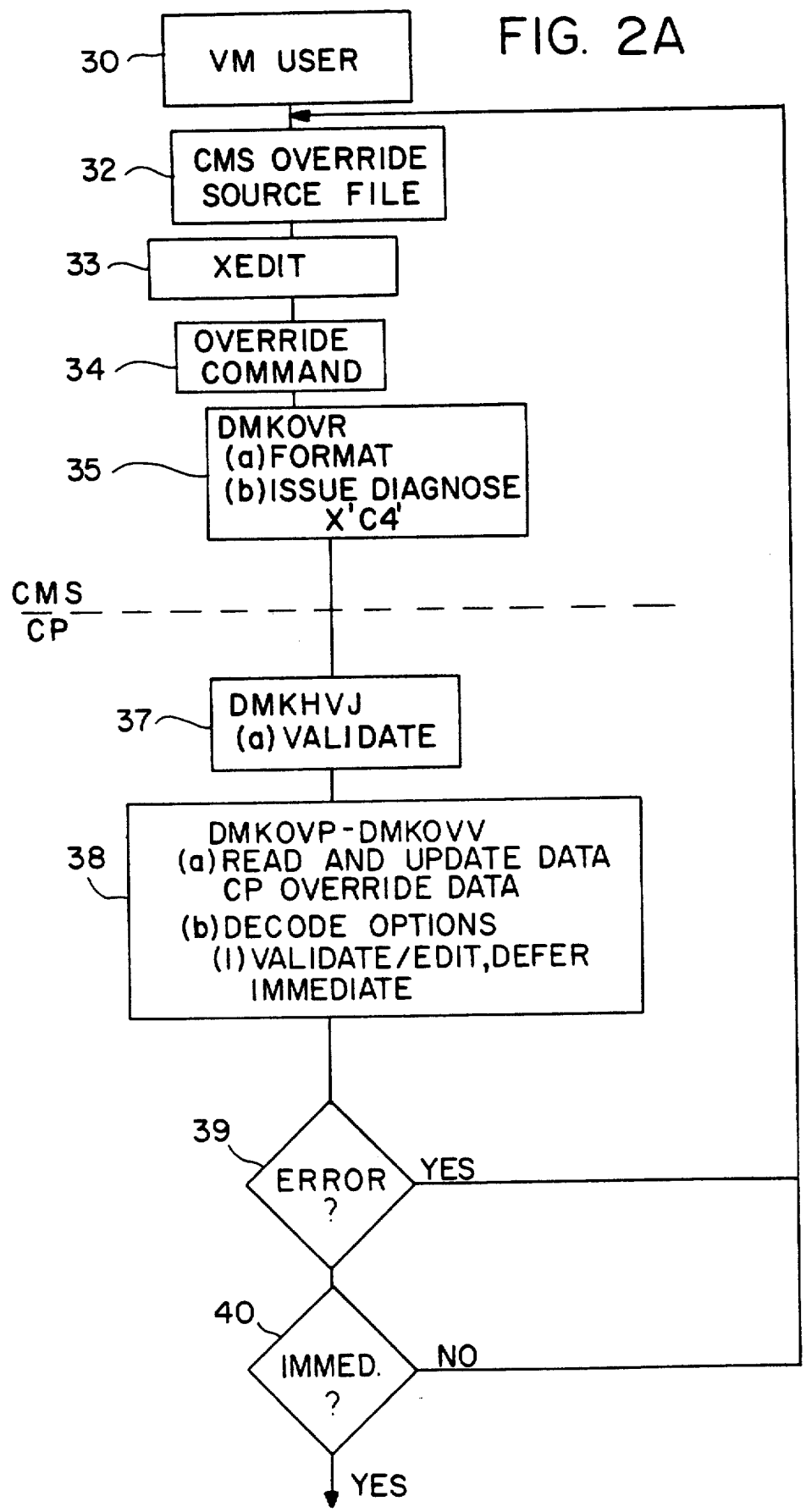

| ENTRYLEN | TAGTYPE | RECNO | TAGDATA... |
|---|---|---|---|
| +0 (2) | +2 (8) | +10 (4) | +14 (VARIABLE) |

FIG. 5

| LENGTH | $FILEID | REC NO | CMSFILEID |
|---|---|---|---|
| +0 (2) | +2 (8) | +10 (4) | +14 (VARIABLE) |

FIG. 6

| 0 | OVEHTYPE | OVEHNEXT |
|---|---|---|

OVEHBLOK

FIG. 7

| 0 | OVELEN | ///////////////////// |
|---|---|---|
| 8 | OVENAME | |
| 10 | OVEDATA | |

OVEBLOK

| OVESSERV | OVESMODL | ///////////// |
|---|---|---|
| 0 | | |
| 8 | OVESSID | |
| 10 | OVESZONE | OVESZID | O*1 |

METHOD AND APPARATUS FOR CONFIGURING A CONTROL PROGRAM NUCLEUS WITH A MINIMUM IMPACT ON SYSTEM AVAILABILTIY

TECHNICAL FIELD

The present invention relates to virtual machine system products (VM/SP), and specifically, a VM/SP system is described which permits changes to the underlying control program (CP) nucleus parameters without requiring a regeneration of the (CP) nucleus or a new initial program load (IPL) of the control program.

BACKGROUND OF THE INVENTION

The IBM VM/SP line of products permits a processor to emulate a plurality of dedicated processors. Each of the users of these emulated processors appear to have all of the facilities of the processor at his disposal for computation. A control program (CP) controls the resources of the real system processor to provide for many virtual machines (VM) each of which appears as an individual processor. A conversational monitor system (CMS) is a second layer of programming protocol which provides a wide range of terminal user dialogue and time sharing services. Using CMS, each of the VM users can create and manage files and compile test and run application programs supplied by each VM user.

The operation of these VM/SP systems requires that common data be available for the control program (CP). Included among these is a requirement that there be system name tables (SNT) which are made up of saved, named object definitions, such as Named Saved Systems (NSS) or Shared Segments (SS). These saved named object definitions are kept in the control program (CP) portion of a direct access storage device (DASD).

In creating these definitions, a macro is utilized to format the data and make it part of the host module (DMKSNT, DMKSYS or DMKBOX). These modules in turn are part of the (CP) nucleus.

In order to modify or change such a CP nucleus, a new nucleus must be generated and formatted such that a subsequent initial program load of the control program will load each of the new and existing nucleus named objects into the control program system memory.

With current VM/SP operating systems, the addition or replacement of these saved named objects necessarily causes a disruption of processing that is experienced by all VM users of the system. Replacement can only be accomplished by a total shutdown of the VM system, followed by a system initial program load, wherein the CP program can retrieve and store in memory the new parameters. This necessarily results in a disruption to each of the VM users.

An additional complication in modifying or "tailoring" the CP nucleus is encountered wherein several VM systems comprise a single large installation of VM systems. These systems may be located in different national regions and may support very different types of application programs. For instance, it would not be unusual for a large company to have VM installations in different countries which, although including many common files to its CMS system, may have a different set of named saved objects resulting in a different CP nucleus for each system. Thus, it is difficult to administer the changes to such a CP nucleus from a central location when the two nuclei are not identical. Forming a single nucleus having parameters sufficient for two different system nucleus requirements adds complexity to the management of the DASD for these saved, named objects.

It is an object of this invention to provide a method for reconfiguring a control program nucleus with minimum disruption for system users.

It is a more specific object of this invention to provide for key system configuration definitions and named saved object definitions in an override source file on a CMS-managed mini-disk.

It is yet another object of this invention to permit the parameters stored in the override source file of a mini-disk to be transferred to the control program without the necessity of a nucleus regeneration or a system IPL for the control program.

It is a further object of this invention to provide the imbedding of files unique to one VM system nucleus with common files used in a multiplicity of VM systems.

It is an additional object of this invention to include with system object definitions sufficient information so that the control program can, while validating individual object definition data, indicate with an error message the particular object definition data and its location on a CMS file, producing an error.

SUMMARY OF THE INVENTION

These and other objects of the invention are provided by a method and apparatus which expands the use of an override source file on a CMS-managed mini-disk to include many system names which were formerly located in a CP nucleus, and now stored on a portion of a DASD dedicated for CP access and control. These removed system names defining such commonly used information as the system ID, user ID, logo description, and printer parameters, are moved to a CP override source file of its DASD. This portion of the DASD serves as an internal override source file to update the control program CP memory storage with newly created parameters.

A newly-configured override source file on the mini-disk can be edited using the system product editor (XEDIT), as is known to skilled VM programmers. Using an OVERRIDE command, the definitions may then be written to the override space on the control program DASD for the control program CP, using a VM DIAGNOSE interface. Definitions in the CMS override source file may be transferred to the CP override space on the DASD, after being converted to a format compatible with the DIAGNOSE interface.

After issuing an appropriate diagnose instruction, control then passes to the CP program wherein the diagnose instruction, containing updated override source file information, is validated. Assuming that the data is validated, the control program CP will write the data to the override portion (allocated as OVRD) of the CP-owned DASD.

Once the new system parameters are in the CP OVRD space of the CP-owned DASD, the invocation of the DMKOVD module, in response to the OVERRIDE command with the IMMEDIATE option issued at the VM administrator's request, updates control program CP memory with the newly-configured and validated data representing data held in the override source file on the mini-disk.

The CP system cannot directly access a CMS file. Therefore, in carrying out the foregoing process of updating the OVRD space with new data, the data is sent via the DIAGNOSE interface in a Tag type format, including the parameter data itself, and a record number in the CP override source file of the DASD. Thus, when an error is encountered by the control program CP when processing the diagnose instruction, the error, along with an identifier of the override source file and the record number of the entry in error, may be displayed to the system administrator through the CMS program. The administrator can then use the editor to correct the data so that a subsequent processing of the diagnose instruction will allow the data to be entered in the override OVRD space.

In accordance with the preferred embodiment, the foregoing system will write the override source file definitions to the control program memory in response to an OVERRIDE command with IMMEDIATE option or system IPL. System default definitions may also be provided in modules that are part of the CP nucleus. Whenever the system object definitions are present in the override source file DASD, the definition on the override source file DASD will override the system default definitions found in the default files.

The foregoing system is useful for setting up and tailoring the portions of the CP nucleus which are maintained in the override source file. In multiple VM systems served by a common administrator, the nucleus files for all systems may include common files and imbedded files for specific systems. A central administrator can work more efficiently and accurately in configuring these imbedded tailored files and then transfer both common and specific system object definitions to the remote location within the connected VM system. Thus, an OVERRIDE command is used at the remote location to update the OVRD space on a CP-owned DASD at the remote location.

BRIEF DESCRIPTION OF THE FIGURES

FIGS. 2A-2B illustrate the steps to generate an override nucleus in the override source file.

FIG. 5 illustrates additional data passed to CP via the diagnose instruction added for diagnostic purposes.

FIG. 6 illustrates the DASD header for the DASD pages read from CP override DASD 23.

FIG. 7 illustrates a general DASD entry read from CP override DASD 23.

DESCRIPTION OF THE PREFERRED EMBODIMENT

Figures 1, 10:
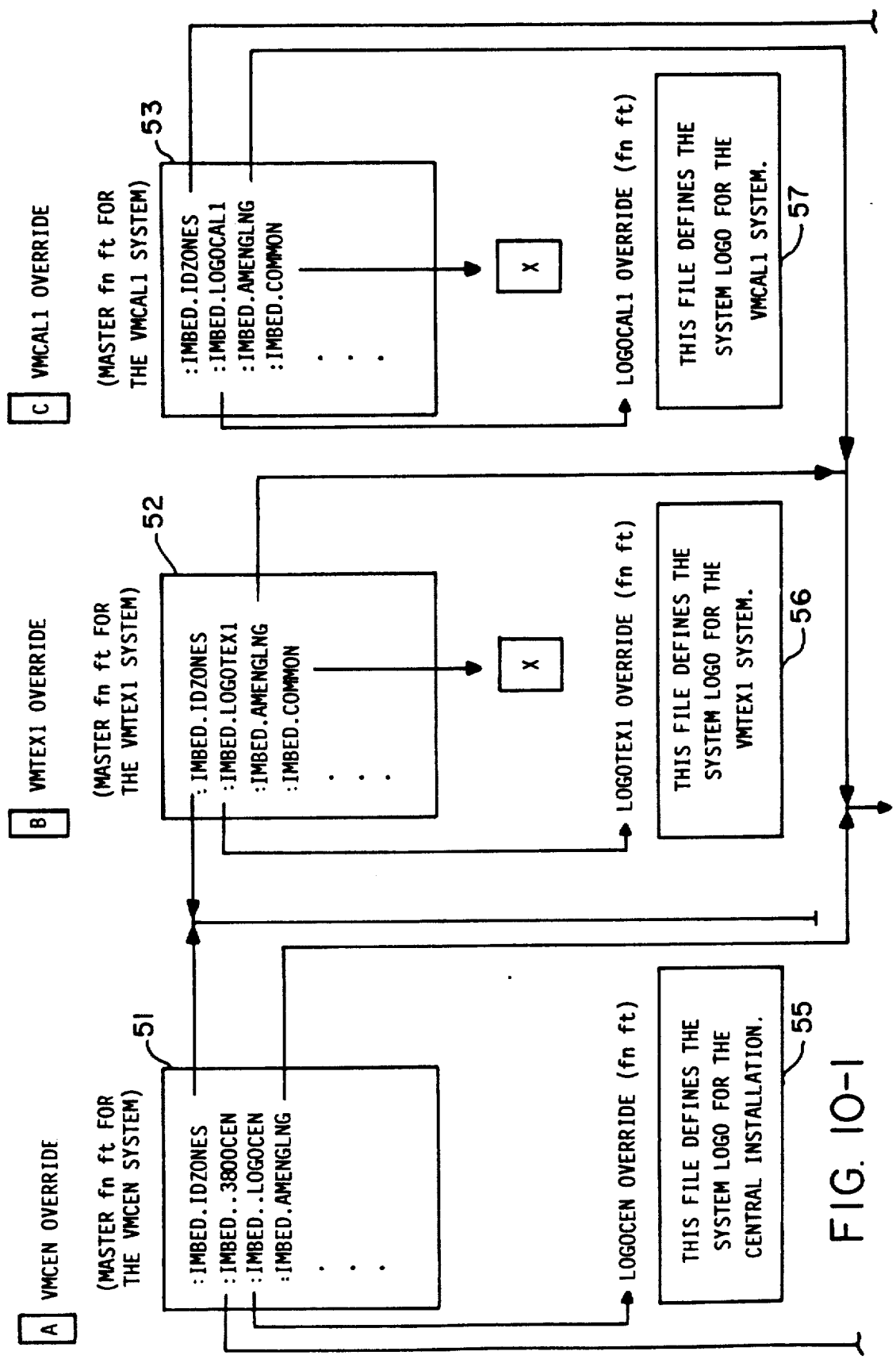
FIG. 1 is a block diagram illustrating the organization of a virtual machine system.
FIG. 10 illustrates how the files making up the system object definitions of a plurality of systems may be organized.
Figures 2, 10:
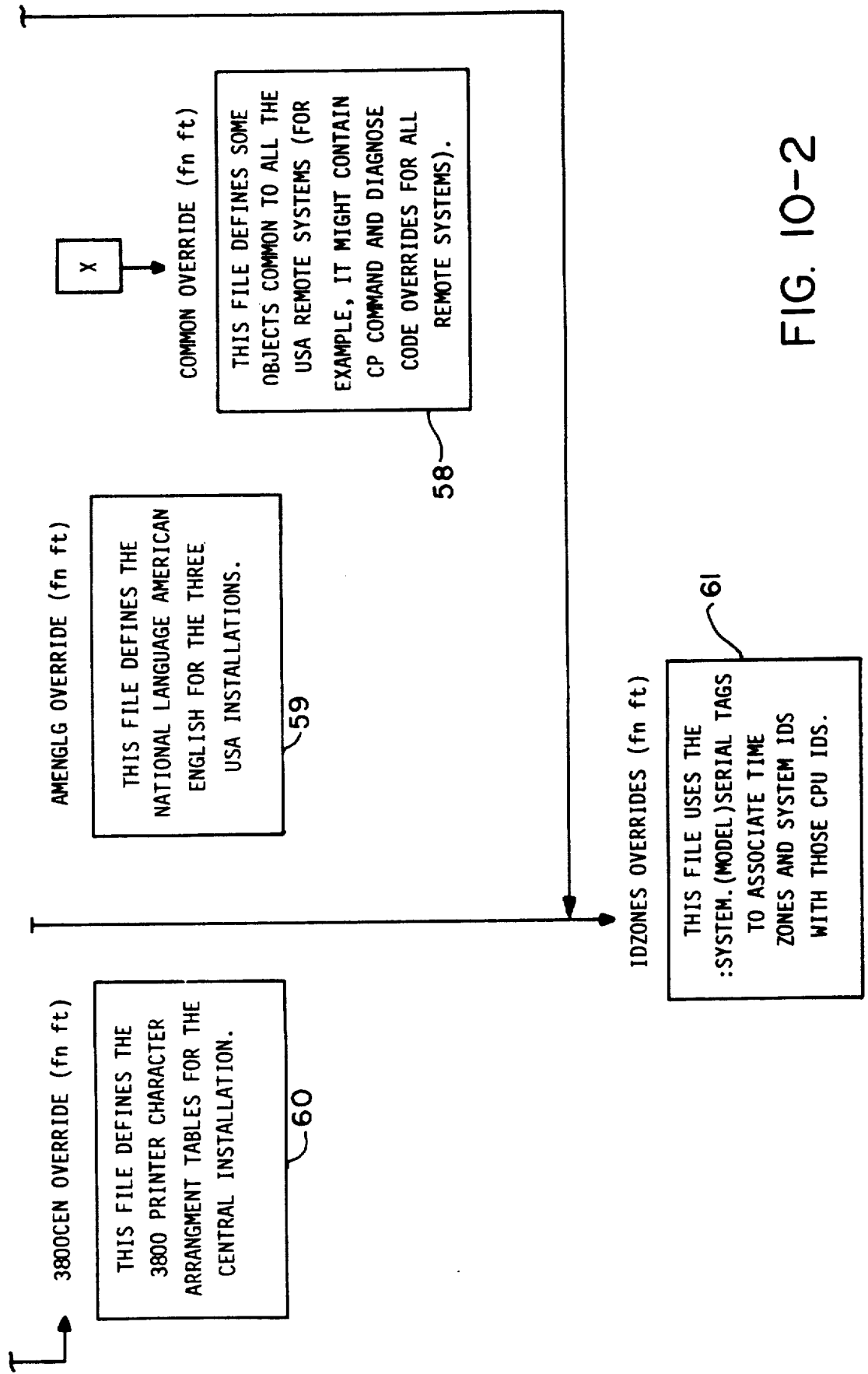

Referring now to FIG. 1, there is shown the general organization of a VM operating system. VM/SP systems are described more particularly in the literature provided by International Business Machines Corporation relating to their virtual machine/system product line.

This product line employs a control program 13 to partition the processor 10 into a plurality of virtual machines, shown as 16a through 18a, connected to work stations 16-18. These virtual machines communicate to a plurality of system users via a CMS program 14, comprising a third layer of protocol for the processor 10. Using the partitioned processor 10, the plurality of virtual machines 16a through 18a will run any number of programs written in various languages supported by the CMS library of the IBM Corporation.

Also shown in FIG. 1 is general disk storage area (DASD) 11, providing DASD storage for the processor 10. The DASD 11 is likewise partitioned into various segments for each of the operating protocol layers 13 and 14 of the processor 10 configured as a virtual machine system.

As set forth in the various guide and reference books on IBM VM/SPs, the DASD 11 is partitioned into a section including a CMS mini-disk portion 21 and CP DASD 22. At system set-up time, the DASD 11 is apportioned, and in accordance with the present invention, includes a CP override DASD 23.

As is known to VM users, the control program CP 13 requires certain nucleus data to be included on the CP DASD storage area 22. This data is referred to as system objects, which are defined in a nucleus associated with the CP DASD storage area 22. These system objects are often subject to changes, as system requirements may change during the course of system use. These changeable system objects may include the following:

saved segments
named, saved systems
VM saved systems
3704/3705 network control programs
3800 printer control image libraries
national language support libraries
privilege classes for CP commands and diagnose codes
time zones
system IDs
system logos
printer separator page logos.

Under current VM system configuration, a user of the VM system may not reconfigure these system objects on the installed system. Such information residing in the CP nucleus stored on the CP DASD 22 may be reconfigured if the control program is rebuilt, the system shut down and a new initial program load (IPL) is effected for the control program CP 13.

Updating and tailoring these system definitions is therefore a disruptive event to all VM users who may be using the system installed on processor 10. Each of the users may, for instance, be actively using this data at the time a new set of data is desired. To shut down the system to effect a re-IPL of the control program CP 13 is disruptive to these users, further reducing the system efficiency.

In accordance with the present invention, it is proposed that such data be moved, or a portion of such data be moved, to a CP override DASD 23. The CP override DASD 23 is accessible from CMS using a diagnose instruction. It is therefore possible to create system object definitions in a CMS source file, and, using the diagnose instruction, transfer such system object definitions to the control program CP.

The use of a CP override DASD 23 is noted in the virtual machine system product guides of IBM Corporation. Data within the CP override DASD 23 can be used to override and replace current operating object definitions in CP 13. In accordance with the present invention, this will not require a regeneration of the CP nucleus or a re-IPL of the system, when transferring data from the CP override DASD 23 to the CP working memory locations. The OVERRIDE command with the IMMEDIATE option may be used to invoke the requisite CP modules to update the system memory locations with the CP override DASD 23 contents, using only a portion of routines involved in a re-IPL of the control program CP 13.

The present invention will provide for tailoring the CP override DASD system object definitions formerly found in the CP nucleus. Using an administrator work station 16 and virtual machine 16a, it is possible to configure new data for transfer across the CMS 14/CP 13 interface, transferring a CMS override source file on the mini-disk 21, in a format for writing to the CP override DASD 23. The data may be conveniently edited in CMS while it is on the CMS minidisk 21, and validated during the transfer to the CP override source file 23. Errors in syntax for each of the new system object definitions may be reported to the system administrator work station 16, and corrected and re-sent back across the CMS 14/CP 13 interface. Validated data received by CP 13 can be used to rewrite the CP override DASD 23 with the new system configuration data. The data becomes active at the next IPL of the CP 13, or, optionally, the data may become active on the current system by specifying the IMMEDIATE option on the OVERRIDE command.

Figure 2B:
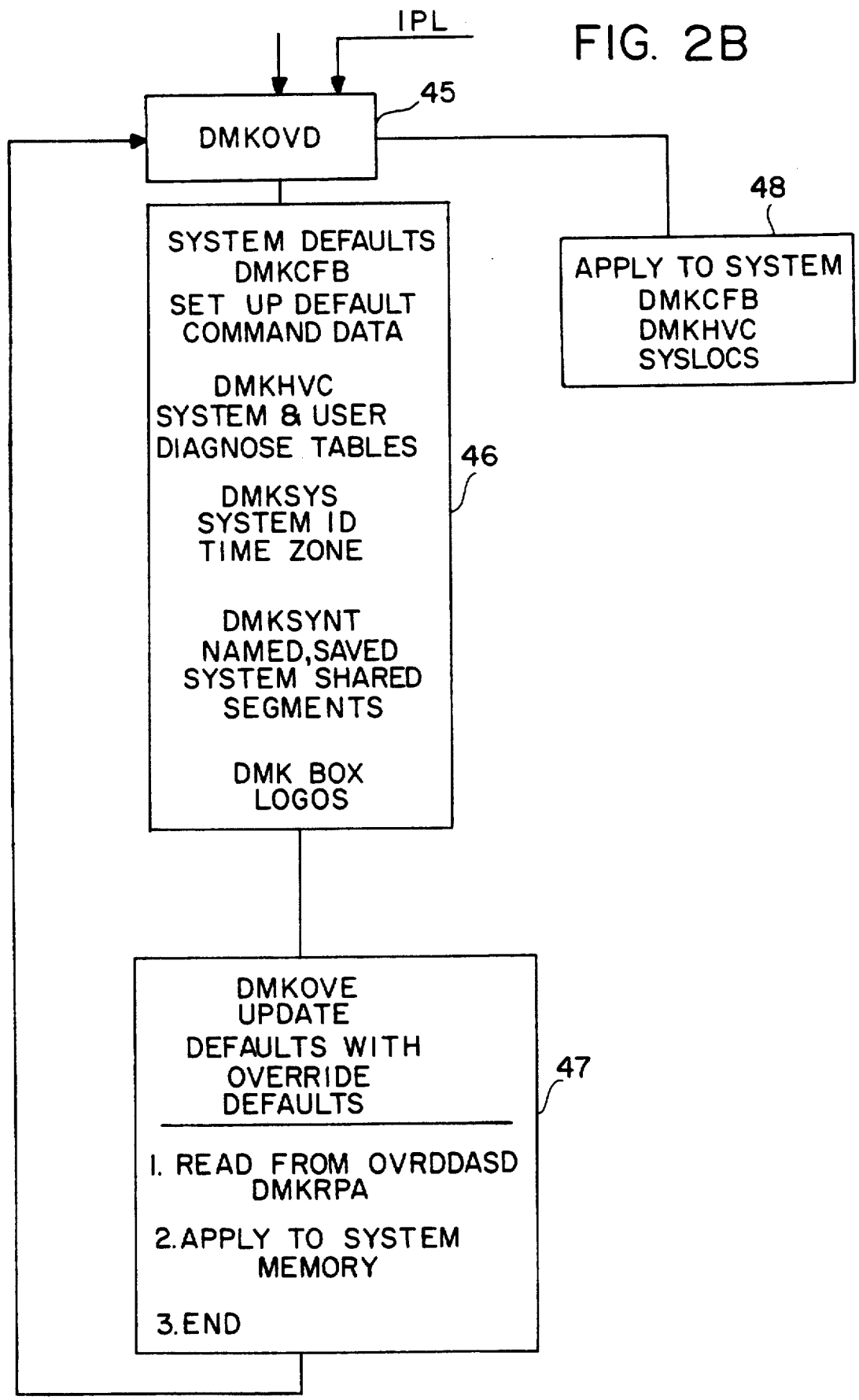

Having generally described the method for providing changes of system object definitions, reference will now be to FIGS. 2A and 2B to describe the specific embodiment used to effect a transfer of tailored system object definitions from a CMS-supported VM administrator minidisk 21 to the CP override DASD 23. Further, FIG. 2B illustrates how the system object definitions are applied to the CP program 13 operating memory locations from the CP OVRD space 23.

In FIG. 2A, there is shown a VM user 30 which would serve as a system administrator using a terminal 16 including VM machine 16a. The system administrator can create and edit a CMS source file of system object definitions. The CMS source file is provided by the CMS mini-disk 21 of the DASD. Using the XEDIT function 33 for VM CMS applications, new system definition data may be formulated for the CP nucleus residing on the CP override DASD 23.

Once the system definition data has been tailored, an OVERRIDE command is issued in step 34 in the CMS environment. The OVERRIDE command exists as a CMS command module generated from CP module DMKOVR. Upon issuance of the OVERRIDE command, this module takes over execution of the command. In executing the OVERRIDE command, the DMKOVR module will format the edited system definition data and then issue a diagnose X'C4' instruction, which will turn over control of the system to CP control program 13, leaving CMS program 14.

In order to traverse the interface between CMS program 14 and control program CP 13, the Diagnose X'C4' instruction must include the system parameter definitions in the data format utilized by the diagnose instruction.

Figure 3:
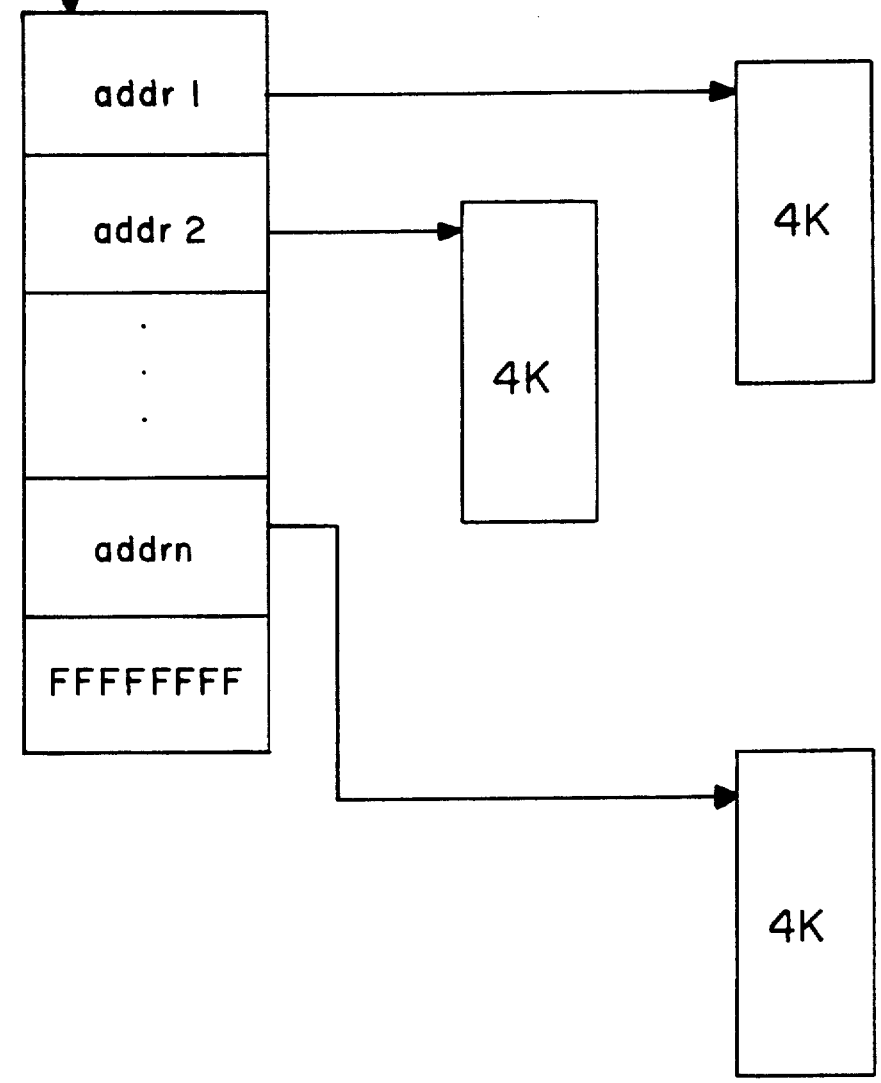
FIG. 3 illustrates the parameter list which addresses the pages of virtual memory containing system object definitions.

This formatting step formats the data as illustrated in FIG. 3, as pages of the system administrators' virtual memory storage addressed by the PLIST. These definitions all appear in the 4K pages.

The standard CP diagnose invocation conventions use an Rx and Ry convention, where Rx points to PLIST. Ry points to a 6-byte volume identifier indicating where the object definitions are to be stored in the CP override source file on the DASD 23. The Ry+1 convention for the CP diagnose invocation will contain the subcode relating to an option specified in the override command (e.g., IMMEDIATE, DEFER, VALIDATE).

Each entry in the parameter list of object definitions will point to a virtual data page in the user's virtual memory. The end of the parameter list is marked by a full word −1 (i.e., X'FFFFFFFF') as is shown in FIG. 3. Further, the final entry in the last data page is followed by a full word 0 (i.e., X'00000000').

Figure 4:
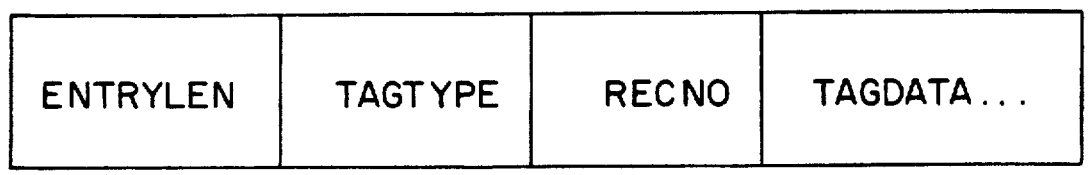
FIG. 4 illustrates the general tag entry format of system object definitions in diagnose instruction format.

These pages of virtual memory containing the object definitions from CMS minidisk 21 are reformatted as a tag entry. As is shown in FIG. 4, the entry for the diagnose instruction of the parameter data is specified by an entry length, identifying the length of the individual tag entry, the tag type which will identify the type of tag employed, and the record number RECNO, which will hold the record number in the CMS input file for this tag entry. The tag data is appended in the variable length field, describing this particular parameter. The DMKOVR module will also store an internal tag entry $FILEID, once for the main input file and then once for every imbedded tag which is processed, and which will be described later herein. When data in an imbedded file has been processed, the DMKOVR will place another such $FILEID tag and return to processing the remaining data in the file that contained the imbedded tag. The $FILEID data is maintained for error reporting purposes. The CP program, when receiving the Diagnose X'C4' data pack containing the tags, will not know where the particular tag is located in the CMS file. By including this information, if the diagnose instruction is decoded by the control program CP 13 and found to contain an error in syntax, it will be possible to report back to the CMS program the record number and the $FILEID information contained in the tag which produced the error data.

Once each of the tags has been formatted in accordance with FIGS. 4 an 5, the Diagnose X'C4' instruction may be issued, and control is then passed to the general diagnose handling module DMKHVC, and then to the DMKHVJ module to process the issued Diagnose X'C4' instruction.

Before writing the tag data received from the CMS file, a validation of the data occurs in step 37 invoking the DMKHVJ module for the control program CP 13. The DMKHVJ module validates the diagnose information for the valid subcode, Rx and Ry before passing control to the DMKOVP module in step 38. The DMKOVP first determines where the CP override space that is to be updated is located on the override DASD 23. The options selected by the administrator include an option to clear or free, that is to remove override definitions from the CP override DASD 23, use default definitions which were initially set up on the CP DASD 22, and revert to the system defaults at the next CP initial program load IPL. In these situations, the DMKOVP just erases the override data pointer in the override DASD 23, and the Class E administrator is informed through work station 16 that the command is completed successfully.

If the Class E user specified the validate/edit defer or immediate option, then DMKOVP will process the data in the 4K pages addressed by the PLIST. A call is made to DMKOVV to validate the input override source data tags. Each tag entry contained in the 4K pages is validated. Whenever an error is detected, error messages are issued to the administrator's screen, indicating which CMS file identifier and record number is associated with the invalid tag entry. As shown in decision block 39, an error is identified to the CMS program, permitting the administrator/VM user to identify and correct the error, and reissue the OVERRIDE command with re-edited tag data.

In processing each tag entry received via the diagnose interface, a corresponding entry is written to the CP override DASD 23. The override DASD space is divided into two sections, such that when processing override data, one half of the override DASD space is written with the new data, and the other half keeps previous data used before the diagnose instruction was received. Only when all the override data is received and validated will the pointer from the previous override data be updated to point to the new section of newly-entered override data. In this way, should the override source files received from CMS contain an error, the currently active override definitions are not destroyed until the newly received data is corrected.

Once all the tag entries have been processed, DMKOVV builds an internal END tag and writes it to the OVRD space to mark the end of the data, and returns control to the DMKOVP. Assuming no errors were received, a determination is made as to whether or not the immediate option has been selected, wherein the administrator issued the OVERRIDE command with the IMMEDIATE option to immediately update the CP program with the newly-written system definitions.

When either an OVERRIDE command with the IMMEDIATE option is issued, or a CP program IPL, the DMKOVD module is invoked by the CP program in step 45. When the DMKOVD is called, the first procedure is to set up the system default object definitions. These default object definitions are read into free storage of the control program CP 13. They are then the actual system object definitions which will be updated by the system object definitions just loaded in the override source DASD 23. In the preferred embodiment of the invention, these default system object definitions include command data set up by DMKCFB, system user diagnose tables set up by DMKHVC, system ID and time zone definitions set up by DMKSYS, system named, saved systems and shared segments set up by DMKSNT, and logos which are set up by DMKBOX, all CP program modules described in the IBM references for virtual machine products.

In step 47, the invoked DMKOVE module updates the system defaults with the override definitions from the CP override DASD 23. The DASD pages are read via calls to the CP module DMKRPA. FIG. 6 illustrates the DASD page header, which is mapped by OVEHBLOK. The designation OVEHTYPE refers to the DASD type, in this case an override, and OVEHNEXT will point to the next DASD page when the override system definitions span multiple DASD pages. Each override definition is read and applied to the system parameters currently represented in free storage. A general override definition is read from the current DASD page. FIG. 7 illustrates the description of a general DASD entry, mapped by the OVEBLOK. The OVELEN is the length of this entry, OVENAME is the tag name for the entry, i.e., whether this entry is a system logo, named saved system or other designated system definition. The OVEDATA is the variable length data that describes the particular entry. OVEDATA is then mapped according to the OVENAME field. For instance, returning to the system tag example, OVEDATA is mapped by OVESBLOK, see FIG. 8, for a system entry. The OVESSERV and OVESMODL are the system serial number and model number, respectively, OVESSID is the system ID and OVEZONE, OVESZID are the time zone offset from Greenwich mean time, and the time zone identifier, e.g., EST. The override definitions are applied to the system defaults in step 48. In accordance with the preferred embodiment, command and diagnose classes can be modified. Named, saved system and shared segment definitions can be added to or replaced. For example, if a definition for CMS is in both DMKSNT, the system default module and in the override DASD 23, the override DASD space will override the system default. Logo definition, system ID and time zone definitions all replace the system defaults which are in the DMKSNT file on the CP DASD 22.

The DMKOVE module 47 continues looping through all the override definitions in the override DASD 23 until all definitions have been read and written to the CP working memory locations in place of default data. The end of the override definitions are marked by the internally created END tag, as was noted with respect to DMKOVV. At this time, control can return to the DMKOVD module 45.

The command and diagnose tables are kept in control program CP 13 modules DMKCFB and DMKHVC, respectively. The system ID, time zone offset and time zone ID are kept in prefix storage area. The remaining configurable nucleus definitions representing system objects are kept in lists that are anchored in DMKSYS (generated by the SYSLOCS macro). For object definitions which can have multiple entries, e.g., named, saved systems, the definitions are anchored in DMKSYS and subsequent entries are chained together in a linked-list fashion. For definitions that have a single entry, such as the normal screen logo, the definition is in DMKSYS and can be thought of as a one element chain. When the DMKOVD module has completed applying the new definitions to the running system memory locations, it will return any free storage it has acquired, and then exit. Control will then return to the CP initialization routine (during a system IPL) or to DMKOVP (during an OVERRIDE command with the IMMEDIATE option). From DMKOVP control is eventually returned to the invoker of the OVERRIDE command.

The foregoing description demonstrates how it is possible for a system administrator, using a VM machine 16 to reconfigure a portion of the control program nucleus, and can do so without requiring a CP nucleus regeneration or a new control program IPL which would otherwise be disruptive to other users of the VM system. Using the OVERRIDE command with the IMMEDIATE option, only certain modules used in a control program IPL need be invoked to update the nucleus.

The foregoing method for updating a VM/SP processing system can be used when such systems are connected together. It is not uncommon for a plurality of such VM/SP systems to be administered from a central location represented by a single VM machine at one VM system. Using a technique for imbedding files common to all VM systems with files unique to only one of such systems, the system administrator can effect changes in the CP nucleus of remotely located VM systems.

Figures 8, 9:
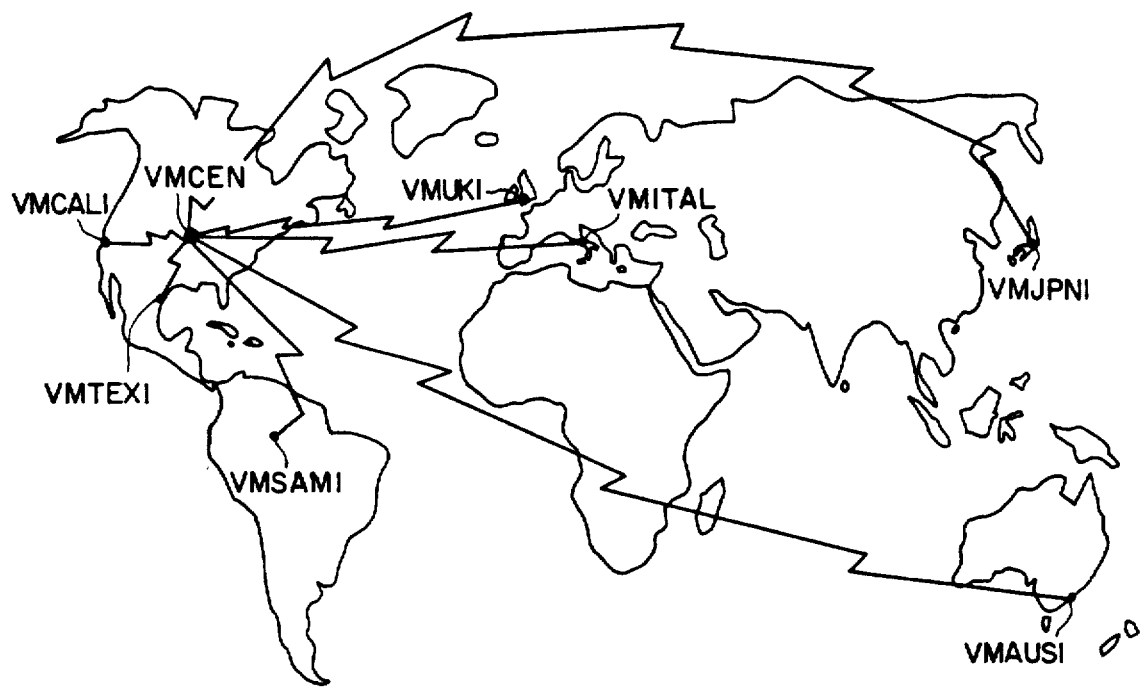
FIG. 8 illustrates a system entry of the system ID, system serial number, model number and time zone where a processor resides.
FIG. 9 illustrates a plurality of remote VM operating systems.

To demonstrate this scenario, FIG. 9 illustrates a plurality of remote VM operating systems. These systems are designated as VMCAL, i.e., for the California system, VMCEN for the Chicago system, VMITAL for the Italian system, etc. It is likely that these systems would each have a distinct control program nucleus because the systems have such differences as being located in different time zones, having different system logos, and operating languages representing the national languages for the location of the remote system. In all likelihood, there would be other differences in system object definitions.

It will be recalled from a discussion of the prior art, that to modify these systems would require the system programmer or administrator at the central site, to generate an entire new CP nucleus for each site, and send that specifically tailored CP nucleus to each remote site.

As it will become apparent, this procedure is not necessary if the foregoing system for updating a CP nucleus is utilized. The system programmer at the central administration site can create any number of master files and files to be imbedded in the master files. Thus, the content of these files will include common files to all systems, as well as distinct files imbedded in the common files, defining distinctive system object definitions for a given location having a VM system. Thus, the CP nucleus needs only to be generated once and can be sent to each remote site.

Referring now to FIG. 10, there is shown a plurality of files for each of the Chicago, Texas and California VM systems. Each of these files 51 through 53, include a common file 58, used to define CMS object definition parameters for each of the systems. Additionally, there are in the files imbedded files unique to each of the three systems. For instance, as can be appreciated, there are different system files 55-57 for logos needed for three of the systems, and there is a file 59 defining the national language for all three U.S.A. installations. There is a file for time zones and system IDs to be associated together 61, as well as one defining printer character tables for a printer unique to VMCEN.

The imbedding of files is accomplished by using an IMBED tag appearing in the files which hold system object definitions. The IMBED tag may take the following format :IMBED. filename filetype filemode.

The IMBED tag gives the appearance of a single continuous file instead of separate files. In reality, however, separate files are being logically connected together.

Before invocation of the OVERRIDE command of FIG. 2A, wherein each of these files is converted to the appropriate format for issuing the Diagnose H'C4' instruction, the CMS source files are edited such that all the necessary imbedded files comprising a system file 51, 52 and 53 is present in the CMS source file. The OVERRIDE command 34, once issued, will invoke the DMKOVR module of the CP program, and proceed to format in accordance with FIGS. 3, 4 and 5, tags containing the requisite system definitions from each of these files. During processing, when an imbedded file is located, the entire imbedded files are formatted to provide the requisite tag entries. After each imbedded file has been formatted, the subsequent imbedded file is formatted until all sub-files have been converted to the tag entry form.

Thus, once the diagnose instruction is issued, all the file data 51, 52 and 53 (including data from imbedded files) may be transferred to the system for updating the OVRD space. An OVERRIDE command with the IMMEDIATE option or subsequent IPL will result in the newly-defined system object definitions being utilized by the respective CP programs. This process is performed at each remote site.

Thus, there has been described with regard to one embodiment, a system for permitting updating of the control program nucleus which will result in minimal disruption to users of these systems. Those skilled in the art will recognize yet other embodiments described by the claims which follow.

What is claimed is:

1. A method for configuring a multiple user vertical machine computing system by a system administrator comprising:

installing in a system processor a control program for dividing operation of said processor into a plurality of virtual machines;

installing a CMS application program in said computing system for providing a plurality of VM operating systems for said users;

providing as part of said control program operating system DASD disk files, said disk files being allocated for control program access, VM mini-disk storage, and control program override source files storage;

storing in said VM mini-disk storage override files having changeable operating data for said control program; and, formatting data stored in said VM minidisk files and forwarding said data via a diagnose instruction to said control program operating system, and storing said forwarded data on said control program override source files storage area of said DASD disk files.

2. The method according to claim 1, wherein said changeable operating data includes a system definition file defining named, saved system and shared segments.

3. The method of claim 2, wherein said changeable operating data includes a definition file which defines a system screen logo.

4. The method of claim 3 wherein said changeable operating data includes system time and system ID from a system definition file.

5. The method of claim 1 wherein said changeable operating data comprises named object definitions for said override source file.

6. The method of claim 5, wherein a portion of said control program nucleus is created from said object definitions in said source file, and is made available to said override storage area in response to a CMS application program executed OVERRIDE command.

7. The method of claim 6, wherein said CP override source storage area is written to system memory locations for said VM users when said control program is subject to an initial program load (IPL).

8. The method of claim 6, wherein said control program override source files storage area is written to control program memory locations in response to a CMS issued OVERRIDE command with an IMMEDIATE option, whereby VM users have immediate access to said data.

9. The method according to claim 5 wherein said VM minidisk file is formatted into a series of statements identified by a tag indicating the type of data being defined or action to be taken.

10. A method for building a common program nucleus for a plurality of interconnected VM systems by a common administrator, comprising:
  installing a control program running on each system for dividing operation of each system into a plurality of virtual machines;
  installing a CMS application program running in each of said VM systems providing a plurality of VM operating systems for each virtual machine;
  creating a nucleus of common data for each control program of said plurality of VM systems at one of said VM operating systems through a virtual machine serving as a system administrator, comprising the steps of:
    creating an editable file of common object definitions shared by said VM systems in a CMS source file of said administrator virtual machine;
    transferring said file of common object definitions to each of the remaining systems utilizing said definitions;
    receiving and storing said file at each of said remaining systems in a source override disk file at each remaining system; and,
    updating a control program memory with said source override disk file data, wherein said common object definitions are available to VM users of each VM system.

11. The method of claim 10 wherein said system administrator creates a common file for all of said VM systems, and through an IMBED tag, incorporates additional files for use by one of said VM systems.

12. The method according to claim 11 wherein objects in a particular file are identified by a tag entry which contains a file identification for said particular file.

13. The method according to claim 11 wherein said system administrator verifies each of the tag entries, and the control program issues an error message identifying which tag entries contain data in error.

14. A method for providing changes in CP nucleus parameters from a VM user in a VM/SP data processing system by a system administrator, comprising:
  (a) loading a control program into said processing system for dividing operations of said system into a plurality of virtual machines;
  (b) installing a CMS application program in said processing system, to provide a plurality of VM operating systems in said virtual machines for a plurality of VM users;
  (c) partitioning DASD files of said system into a plurality of CMS mini-disks for said virtual machines, a CP disk for storage of control program data, and an override storage disk for storing control program nucleus objects definition data;
  (d) validating and writing said control program nucleus parameters to said override storage disk comprising the substeps of:
    (i) issuing an OVERRIDE command to said control program;
    (ii) formatting said control program nucleus parameter data and forwarding said parameter data to said control program via a diagnose instruction;
    (iii) writing said override storage disk with said forwarded nucleus data, whereby newly-tailored data is made available as control program nucleus data; and,
  (e) invoking an IPL of said control program, wherein said newly-tailored data is introduced into said control program system memory from said override storage disk.

15. The method according to claim 14 further comprising:
  reading into free storage of said control program system memory system default object definitions; and,
  updating the system default definitions with said newly-tailored data.

16. The method according to claim 15, wherein said CP override storage disk is partitioned into first and second areas, said first area containing previously validated tailored data, and the second area containing newly-received tailored data.

17. The method according to claim 16, wherein said control program diagnose processing validates said data before writing said data to said override disk.

18. The method according to claim 14, wherein said CMS program formats each of said parameter data as a tag, including data for identifying the type of tag, the record number of a CMS input file containing said tag, and the object definition data.

19. A system for permitting changes in a control program nucleus in a VM/SP data processing system by a system administrator comprising:
  a processing system having a control program dividing operations of said system into a plurality of virtual machines;
  a DASD connected to said processing system, said DASD partitioned into a section of CMS mini-disks, a CP disk for storage of control program data, and an override source file for storing control program nucleus object definition data; and a system administrator communicating through one of said virtual machines via a CMS operating system running on said processing system; said administrator having means for providing through said CMS program control program nucleus parameter data through the program steps of:
    (i) issuing an OVERRIDE COMMAND to said control program;
    (ii) formatting said control program nucleus parameter data and forwarding said parameter data to said control program via a diagnose instruction; and,
    (iii) writing said override storage disk with said nucleus parameter data whereby newly tailored data is made available as control program nucleus parameter data for said control program.

20. The system of claim 19 wherein said system administrator is connected to issue nucleus parameters to a plurality of processing systems which provide a plurality of virtual machines.

21. The system of claim 19 wherein said administrator supplies a general control program nucleus to each of said plurality of processing systems.

* * * * *

UNITED STATES PATENT AND TRADEMARK OFFICE
CERTIFICATE OF CORRECTION

PATENT NO. : 5,257,376
DATED : October 26, 1993
INVENTOR(S) : Beck et al

It is certified that error appears in the above-identified patent and that said Letters Patent is hereby corrected as shown below:

In column 12, line 27, delete "diagnose";

on line 44, with new paragraph with "and";

on line 47, start new paragraph with "said administra- ".

Signed and Sealed this

Sixth Day of September, 1994

Attest:

BRUCE LEHMAN

Attesting Officer    Commissioner of Patents and Trademarks